US008602658B2

(12) United States Patent
Hopmann et al.

(10) Patent No.: US 8,602,658 B2

(45) Date of Patent: Dec. 10, 2013

(54) SPOOLABLE SIGNAL CONDUCTION AND CONNECTION LINE AND METHOD

(75) Inventors: Don A. Hopmann, Alvin, TX (US); Luis E. Mendez, Houston, TX (US); Darin Duphorne, Houston, TX (US); Darin Willauer, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 370 days.

(21) Appl. No.: 12/701,131

(22) Filed: Feb. 5, 2010

(65) Prior Publication Data

US 2011/0194817 A1 Aug. 11, 2011

(51) Int. Cl.
*G02B 6/38* (2006.01)

(52) U.S. Cl.
USPC ............. 385/55; 439/271; 439/502; 166/380; 166/65.1

(58) Field of Classification Search
USPC ................ 385/55; 439/271, 502; 166/380, 65
See application file for complete search history.

(56) References Cited

U.S. PATENT DOCUMENTS

| | | | | |
|---|---|---|---|---|
| 5,152,343 | A | 10/1992 | Kilgore | |
| 5,165,480 | A | 11/1992 | Wagoner et al. | |
| 5,172,765 | A | 12/1992 | Sas-Jaworsky et al. | |
| 5,745,047 | A | 4/1998 | Van Gisbergen et al. | |
| 6,464,004 | B1 | 10/2002 | Crawford et al. | |
| 6,561,278 | B2 | 5/2003 | Restarick et al. | |
| 6,644,403 | B2 | 11/2003 | Pichery et al. | |
| 6,715,550 | B2 * | 4/2004 | Vinegar et al. | 166/250.15 |
| 6,766,853 | B2 | 7/2004 | Restarick et al. | |
| 6,923,273 | B2 * | 8/2005 | Terry et al. | 175/45 |
| 6,981,553 | B2 * | 1/2006 | Stegemeier et al. | 166/300 |
| 7,021,388 | B2 | 4/2006 | Williams | |
| 7,036,601 | B2 | 5/2006 | Berg et al. | |
| 7,055,592 | B2 * | 6/2006 | Bass et al. | 166/66.5 |
| 7,147,059 | B2 * | 12/2006 | Hirsch et al. | 166/372 |
| 7,311,144 | B2 | 12/2007 | Conrad | |
| 7,554,458 | B2 * | 6/2009 | Hudson et al. | 340/854.9 |
| 7,708,057 | B2 | 5/2010 | Aivalis et al. | |
| 7,748,466 | B2 | 7/2010 | Aivalis et al. | |
| 7,839,252 | B2 * | 11/2010 | Heinrich et al. | 336/198 |
| 7,845,415 | B2 * | 12/2010 | Allen | 166/375 |
| 7,909,101 | B2 | 3/2011 | Conrad | |
| 2002/0029883 | A1 | 3/2002 | Vinegar et al. | |
| 2002/0112861 | A1 | 8/2002 | Restarick et al. | |
| 2003/0164240 | A1 | 9/2003 | Vinegar et al. | |
| 2004/0065443 | A1 | 4/2004 | Berg et al. | |
| 2004/0094311 | A2 * | 5/2004 | Hopper et al. | 166/382 |
| 2004/0108118 | A1 | 6/2004 | Williams | |

(Continued)

OTHER PUBLICATIONS

International Search Report and Written Opinion; Mail Date Jul. 26, 2011; International Application No. PCT/US2011/023696; International Filing Date Feb. 4, 2011; Korean Intellectual Property Office; International Search Report 5 pages; Written Opinion 4 pages.

Chaudhuri, Jay et al. "Quick Disconnectable Catenary Electrical Umbilical for Bruce Field Development," [Abstract Only], Offshore Technology Conference, May 3-6, 1993, Houston Texas.

Ellisor, Tim W. et al. "Canyon Express Deepwater Umbilical and Control System: Design and Installation" [Abstract Only], Offshore Technology Conference, May 5-8, 2003, Houston Texas.

(Continued)

*Primary Examiner* — Ellen Kim
(74) *Attorney, Agent, or Firm* — Cantor Colburn LLP

(57) ABSTRACT

A spoolable signal conduction and connection line for a downhole environment including a length of signal conduction and connection line suitable for the downhole environment; and one or more connectors depending from the line along a length of the line, the connectors capable of making a signal bearing connection for the downhole environment.

22 Claims, 8 Drawing Sheets

(56) References Cited

U.S. PATENT DOCUMENTS

| | | | | |
|---|---|---|---|---|
| 2004/0262011 | A1 | 12/2004 | Huckabee et al. | |
| 2005/0072564 | A1 | 4/2005 | Grigsby et al. | |
| 2006/0137881 | A1 | 6/2006 | Schmidt et al. | |
| 2008/0066905 | A1 | 3/2008 | Aivalis et al. | |
| 2008/0311776 | A1 | 12/2008 | Cox et al. | |
| 2010/0059233 | A1 | 3/2010 | Smithson et al. | |
| 2010/0224368 | A1* | 9/2010 | Mason | 166/302 |
| 2010/0294506 | A1 | 11/2010 | Rodriguez et al. | |
| 2010/0319936 | A1 | 12/2010 | Alff et al. | |
| 2011/0194817 | A1* | 8/2011 | Hopmann et al. | 385/55 |
| 2011/0210542 | A1* | 9/2011 | Makselon et al. | 285/330 |
| 2011/0272148 | A1* | 11/2011 | Lovell et al. | 166/250.17 |

OTHER PUBLICATIONS

Mitsui, T. et al. "Development of Composite Fiber-Optic Electric-Power Umbilical Cable and Optical Feedthrough for Deep Ocean Mining" [Abstract Only], International Wire and Cable Symposium Proceedings, Jan. 1983, pp. 125-133.

Moore, B.K. "Rigless Completions: A Spoolable Coiled-Tubing Gas-Lift System" [Abstract Only], Offshore Technology Conference, May 3-6, 1993, Houston Texas.

"Spoolable Composite Tubular Applications", [online], [retrieved on Jun. 24, 2010]; retrieved from the Internet http://www.compositesworld.com/articles/spoolable-composite-tubular-applications.

* cited by examiner

SPOOLABLE SIGNAL CONDUCTION AND CONNECTION LINE AND METHOD

BACKGROUND

In the drilling and completion industry it is known to employ spoolable control and or monitoring lines whether they be hydraulic lines, electric lines, fiber optic lines, combinations of these, etc. Such lines are delivered as long continuous lines that are then spliced at any location along the tubing string where such a splice is necessary. Generally, splices are needed anywhere a facilitation of the control or monitoring action of the line is needed.

Splicing is a very reliable technology but is time consuming and labor intensive. For each splice, which occurs twice for every connection except for a last one along a line, the line must be cut, stripped connected and pressure tested. Such connections slow down progression of tubing strings being run into the borehole and hence detract from productivity and efficiency. The art is insatiably interested in any advance that improves either of these metrics.

SUMMARY

A spoolable signal conduction and connection line for a downhole environment including a length of signal conduction and connection line suitable for the downhole environment; and one or more connectors depending from the line along a length of the line, the connectors capable of making a signal bearing connection for the downhole environment.

A spoolable signal conduction and connection connector for a line including a housing; one or more line stubs extending from the housing, the one or more line stubs being configured to pressure tightly attach to a line such that the connector when attached to the line is part of that line; a volume defined by the housing; a contact assembly disposed within the housing; and a pressure seal at the housing and pressure tightly receptive of a receptor.

A method for signal connecting a line to a tubing string including spooling out the line of a length of signal conduction and connection line suitable for the downhole environment; and one or more connectors depending from the line along a length of the line, the connectors capable of making a signal bearing connection for the downhole environment; and joining the one or more connectors with one or more complementary receptors disposed in components of the tubing string.

BRIEF DESCRIPTION OF THE DRAWINGS

Referring now to the drawings wherein like elements are numbered alike in the several Figures.

DETAILED DESCRIPTION

Figure 1:
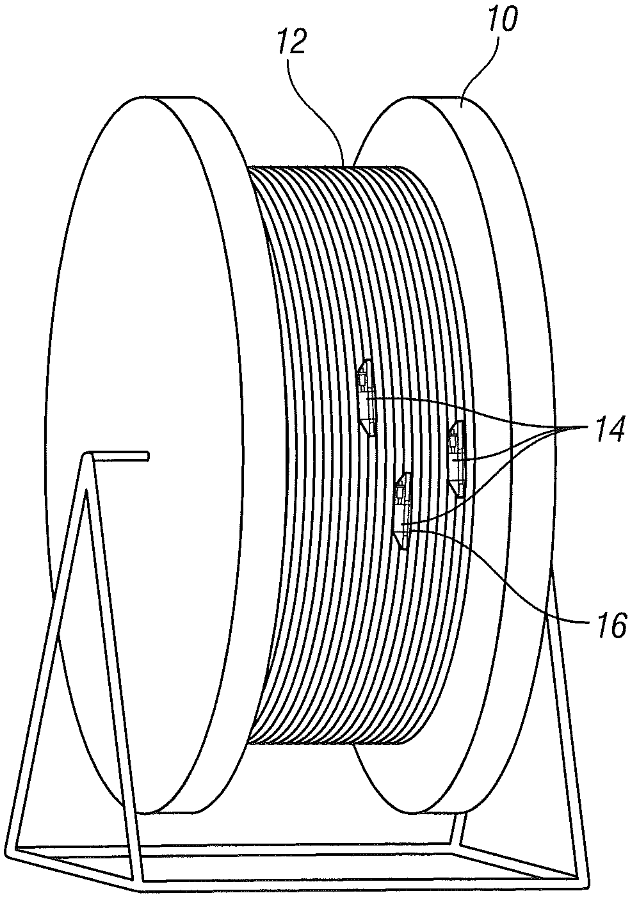
FIG. 1 is a schematic perspective view of a spool of conductor and connector line disclosed herein.

Referring to FIG. 1, one of skill in the art will recognize the schematic representation of a spool 10 containing a length of spooled line 12. Further illustrated are three connectors 14 each covered in a protective sleeves 16. Although only three of the connectors are illustrated it is to be understood that more or fewer may be included as desired or as needed for a particular application. It is further to be understood that one or more of the lines may conduct different types of signals and that one or more of the lines may comprise a different type of conductor. “Signal” as used herein is intended to mean any kind of signal for communication and/or power delivery including electrical, optic, acoustic, etc.

Figure 2:
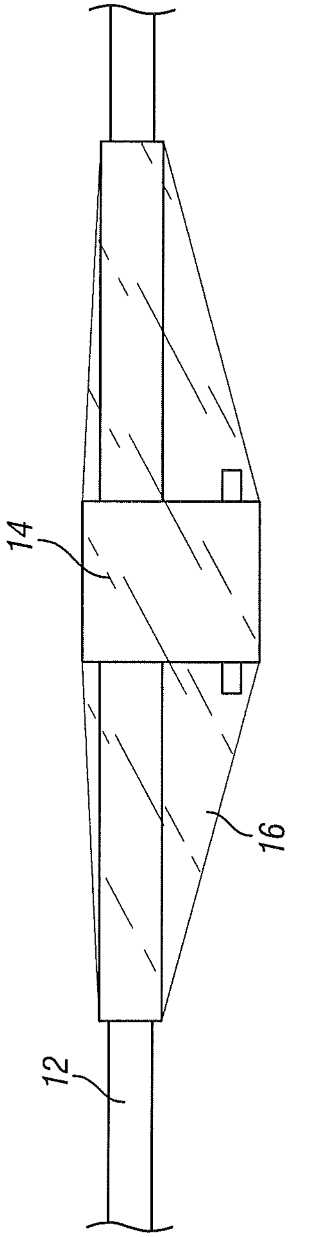
FIG. 2 is a schematic view of one of one or more connectors along the line of FIG. 1 illustrated in an enlarged format.

Referring to FIG. 2, an enlarged view of one of the connectors 14 with sleeve 16 is presented. The connector is illustrated on a line, which is illustrated as ¼ inch capillary line. Such lines are well known to those of skill in the art for use as hydraulic control lines, Tubing Encapsulated Conductor (TEC) lines, and as jackets for other lines such as fiber optic lines. Other kinds of lines can be substituted as needed.

The protective sleeve illustrated in FIGS. 1 and 2 comprises a material having sufficient mechanical characteristics to provide some protection to the connector 14 during spooling, unspooling and handling. The protective sleeve 16 is intended to reduce contamination infiltration and to reduce edge damage from minor bumping or scraping of the connector. The sleeve may comprise tape such as silicone tape, shrink-wrap material or similar material.

Figure 3:
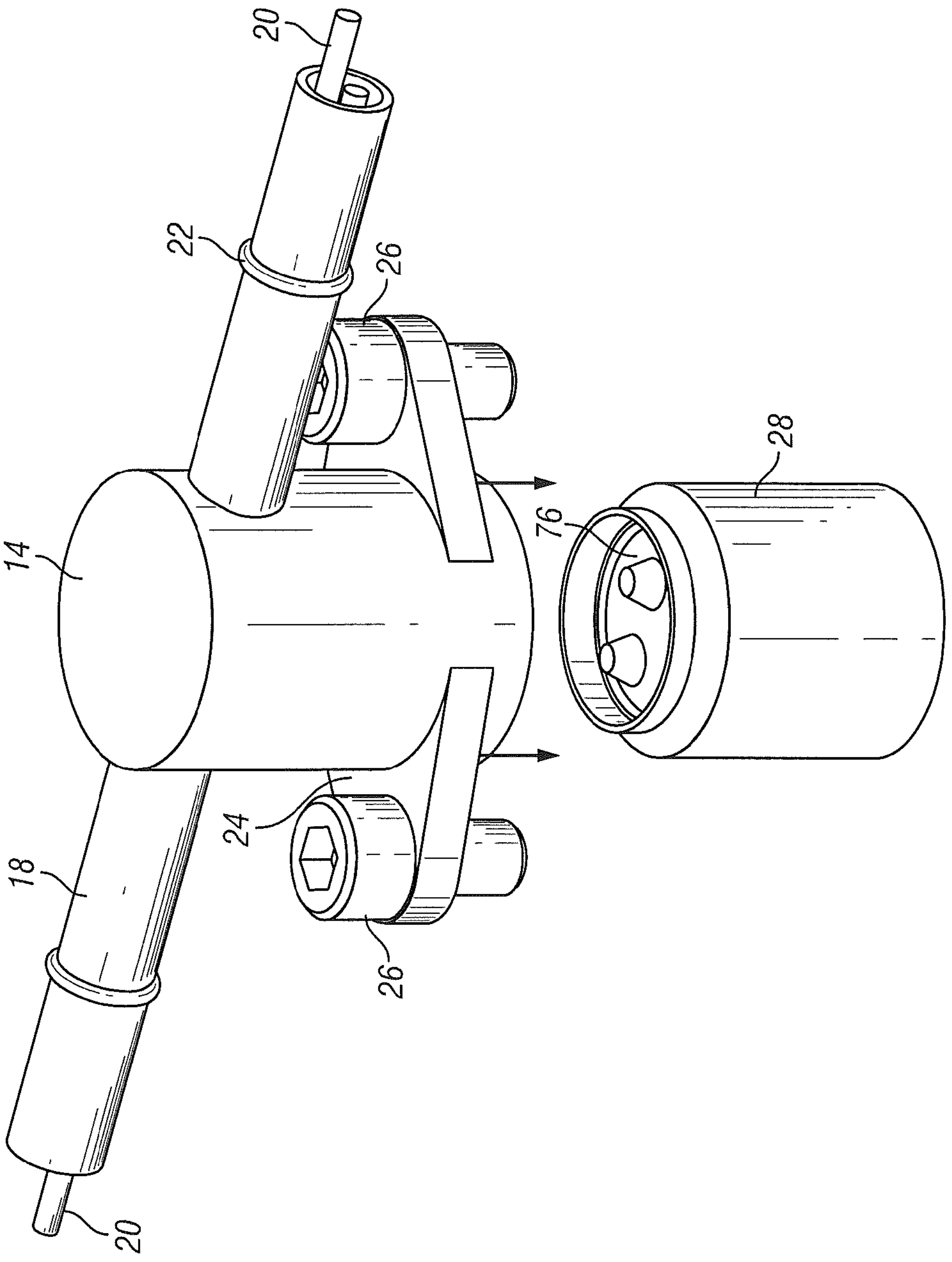
FIG. 3 is a further enlarged view of a connector exploded away from a complementary connection point for the connector.
Figure 4:
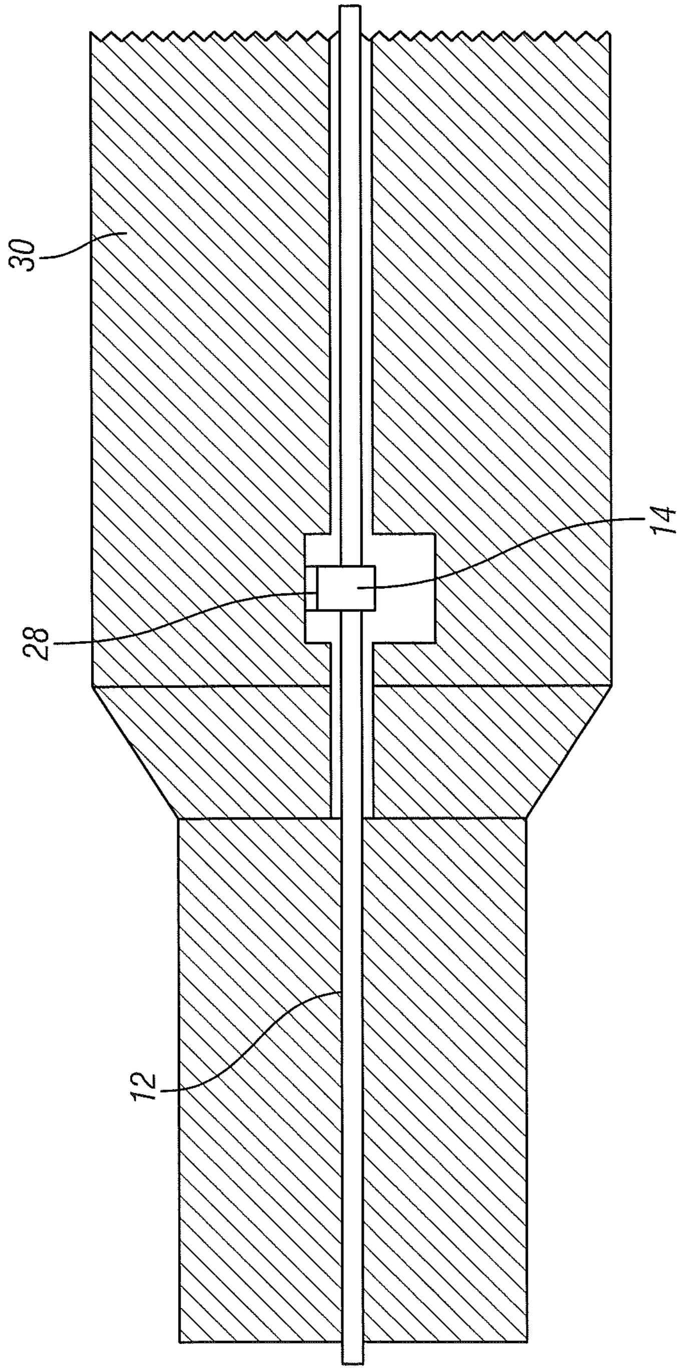
FIG. 4 is a schematic view of a portion of the line and one connector in position along a string and connected to a component of the string.

Moving to FIG. 3, some features of construction of the connectors 14 are illustrated. Each connector 14 includes at least one (end of line 12) line stub 18 and is thereby integrally mounted to the line 12 and thereby has access to one or more conductors 20 within the line 12. In one embodiment, the conductors will number three to promote the use of the spoolable line with multiple flow control configurations along a tubing string. In this view, it is plain to see that each of the connectors is joined at a manufacturing facility to the line 12 of choice. This occurs in one embodiment using an orbital weld 22. It should be appreciated that in one embodiment an attachment flange 24 is provided to facilitate securement to a component of the string (shown in FIG. 4). Although not required it is noted that in the illustrated embodiment, the flange 24 is swiveled relative an axial direction of the line 12 to facilitate easy access to the one or more fasteners 26. Receptor 28 is illustrated directly below the connector 14 to show interengagement of the same. This will be further understood with reference to FIG. 4 wherein a component 30 of the string (not fully shown) is illustrated with the line 12 and connector 14 interengaged with a receptor 28.

Figure 5:
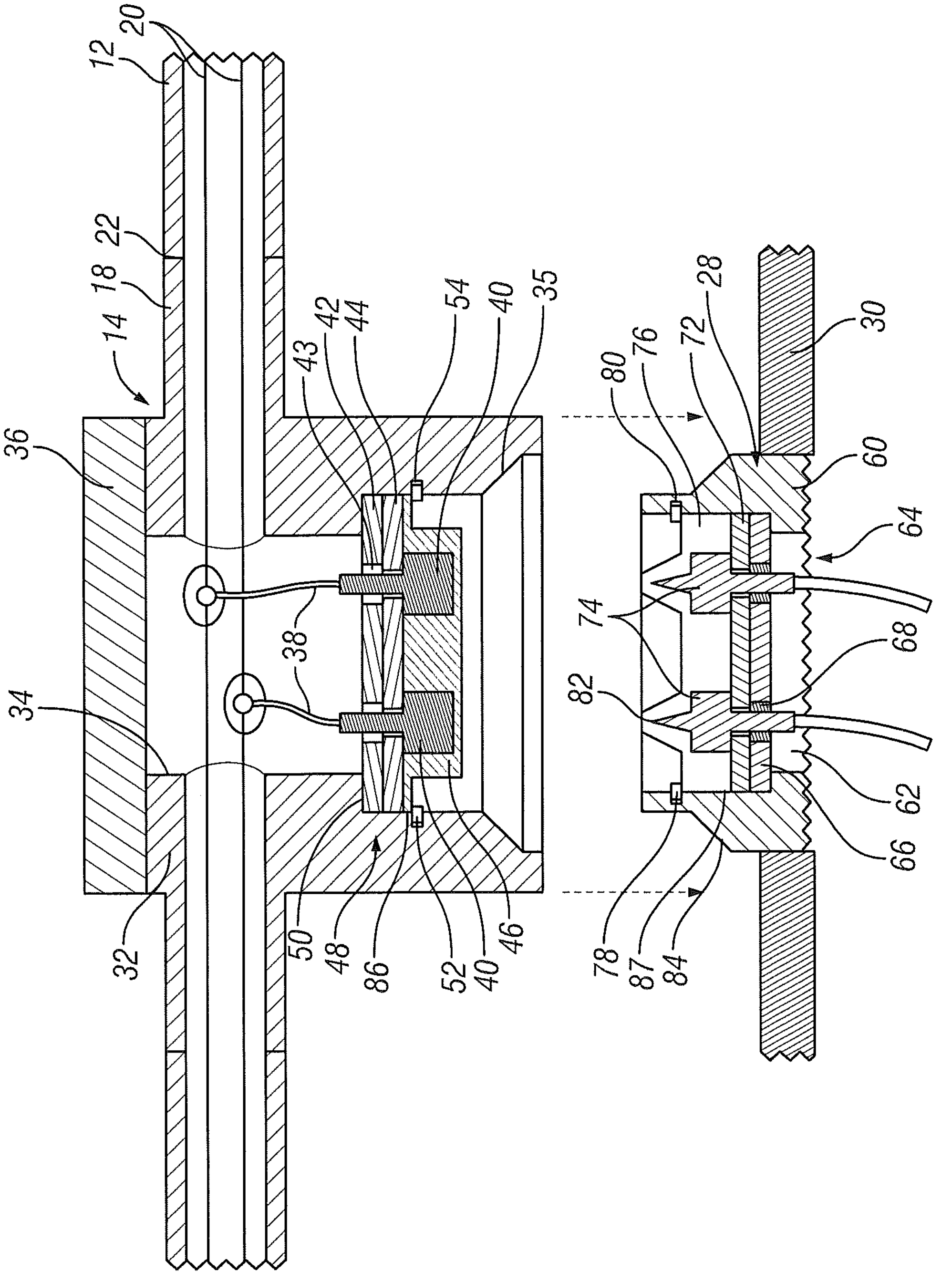
FIG. 5 is a cross sectional view of one of the connectors exploded away from a cross section view of a connection point.

Referring to FIG. 5, a cross sectional view of the connector 14 exploded away from the receptor 28 is illustrated. This view provides a more complete view of how the connector concept functions and achieves the goal of a signal propagation and pressure tight connection without the need for stripping, connecting, and pressure testing common in prior art systems.

The connector 14 includes a housing 32 defining a volume 34 therewithin wherein certain components described below are housed and a frustoconical metal to metal seal surface 35. For ease of construction, some embodiments include a cap 36 that is attached after connections internal to the connector 14 are made. The cap 36 may be attached to the housing 32 via welding, threading, adhesive, etc. The volume 34 is shown to be open to the inside of the line 12 and accordingly the conductors 20 within the line 12 pass through the volume 34 leaving them available for interconnection. The conductors 20, two of them for the illustrated embodiment, are each connected to a tap 38. Each tap 38 extends to and/or becomes a contact 40. It is to be appreciated that in one embodiment, each tap 38 extends through a reinforcing plate 42 that may be metal or other material having sufficient rigidity to support the contacts 40. A seal 43 is disposed between the plate 42 and the contacts 40 at the pass through of the contact and the plate. In the case where the reinforcing plate is a conductive material such as metal, an insulator plate 44 is disposed between the reinforcing plate and the contacts 40. Finally a resilient insulator 46 is positioned to cover the contacts 40 to prevent the infiltration of contamination. The above noted structures are together termed the contact assembly 48. The contact assembly is maintained in place within the housing 32 by being positioned between a shoulder 50 and a snap ring 52 that is received in a groove 54 within the housing 32. Insulator 46 is compressed against connector housing 32 sealing off the interior of the connector at surface 86. In the condition just described, the contact assembly 48 is protected from contaminants and ready for interconnection with the receptor 28.

Figure 6:
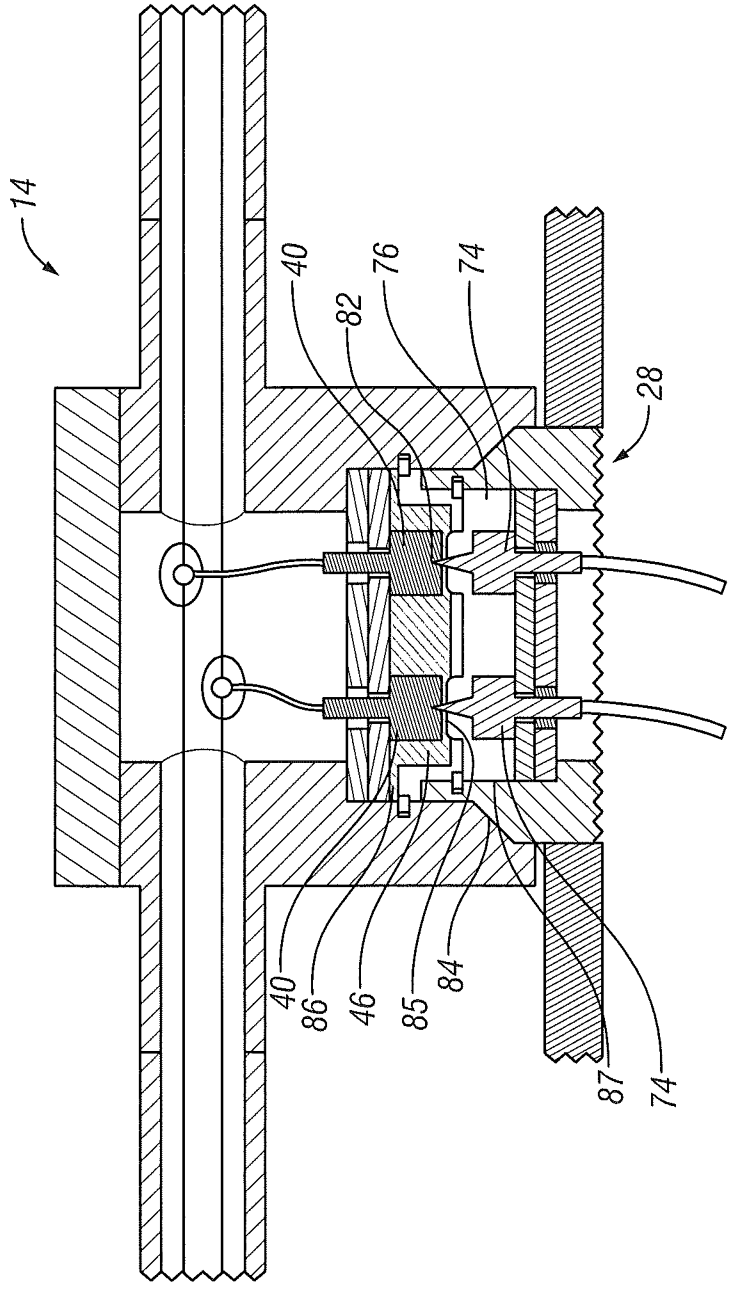
FIG. 6 is a cross sectional view of one of the connectors mated to the connection point.

The receptor 28 itself includes a receptor housing 60 defining a volume 62 therein into which a receptor contact assembly 64 is receivable and bearing metal to metal seal surface 84 configured to interact with the frustoconical surface 35 on the connector 14. The contact assembly 64 includes a reinforcing plate 66 having seals 68 through which receptor contacts 74 extend and are pressure sealed. An insulator plate 72 is positioned between the reinforcing plate 66 and contacts 74 (two shown to be complementary to the connector 14). The contacts 74 are covered in a resilient insulator 76 that protects the contacts 74 from contaminant infiltration. The assembly 64 is maintained in the volume 62 of the receptor housing 60 by a snap ring 78 in a groove 80 or other similar construction. Insulator 76 is compressed against receptor housing 60 sealing off the interior of the connector at surface 87. It is to be appreciated that the contact assemblies may be constructed as shown in respect of which housing they are disposed or may be easily constructed in the reverse. Either way, upon bringing the connector and the receptor together as shown in FIG. 6, the contacts 74, having a sharp leading end 82 will penetrate the insulator 46 and to some extent penetrate or at least solidly contact the contacts 40 to provide for a reliable electrical connection. Primary pressure sealing of the interface between the connector 14 and the receptor 28 is via metal-to-metal seal at surface 84. Insulator 46 and insulator 76 are compressed at surface 85 providing a secondary seal around each set of mated contacts. The seal at surface 86 provides a secondary seal protecting the interior of the connector. The seal at surface 87 provides a secondary seal protecting the interior of the receptor. The construction allows for rapid connection of the spoolable line with tubing components during running without the efficiency challenges of the prior art.

Figure 7:
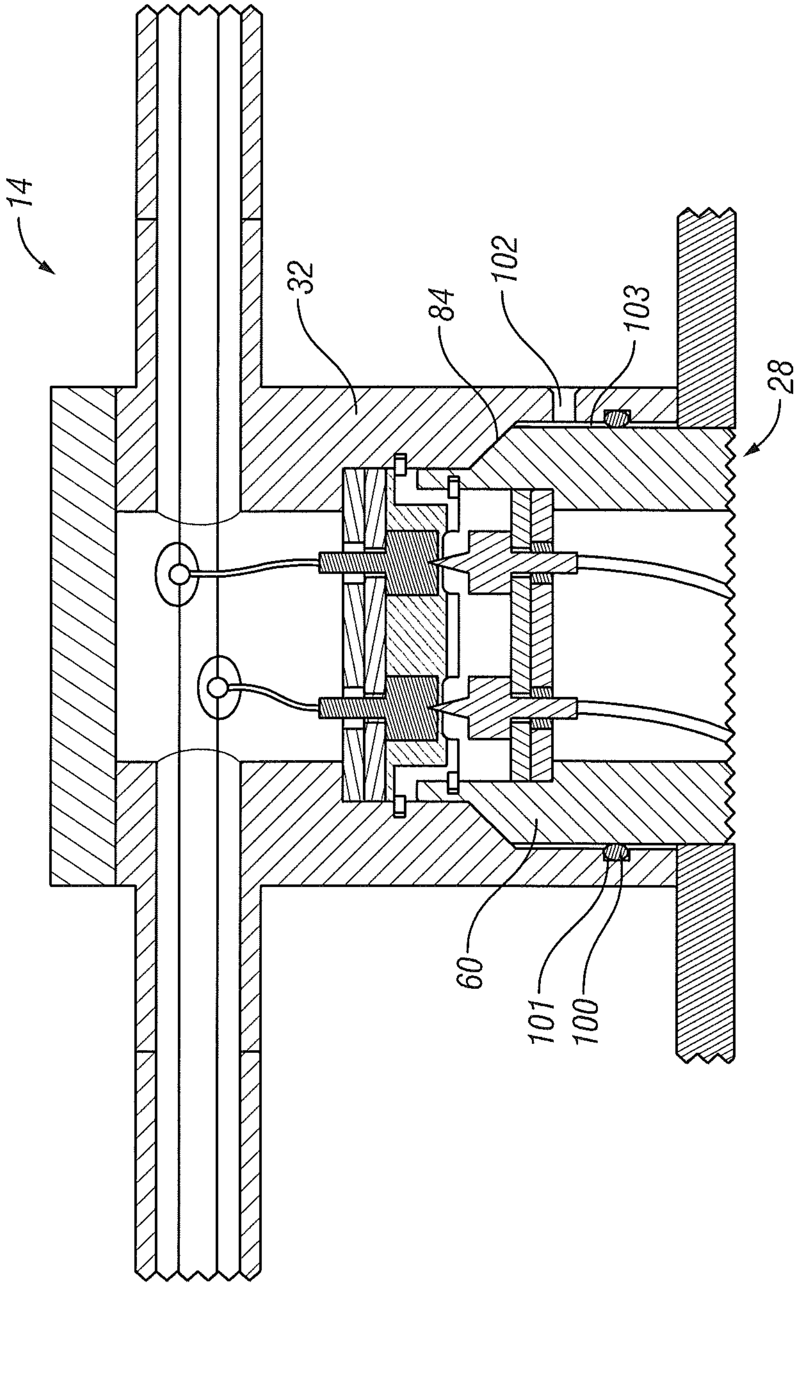
FIG. 7 is a cross sectional view of a pressure-testable connector mated to a connection point.

In some cases it is desirable to have the capability to verify the integrity of the primary metal-to-metal pressure seal through pressure testing the mated connector assembly. Referring to FIG. 7, an alternate embodiment is illustrated with this capability. This embodiment is similar to that shown in FIGS. 5 and 6, but adds an o-ring 100 disposed between housing receptor 60 and housing 32 at a groove 101 to locate the o-ring 100. Further, a pressure test port 102 is disposed in the housing 32 leading from outside of the housing 32 to an annular volume 103 between the o-ring 100 and the metal-to-metal interface defined between seal surface 35 and seal surface 84. A source of controlled pressure connected to the port 102 allows a pressure test to verify function of the metal-to-metal seal at the interface between surface 35 and surface 84 via pressure decay monitoring either remotely or at the site of the connection. The balance of the components of this embodiment, share identical numerals with the foregoing embodiment for clarity.

While the previous embodiments illustrate contact assemblies where one contact penetrates or solidly contacts the other to make electrical contact, it will be apparent that these contacts may be replaced with pin and socket type electrical contacts, fiber optic contacts, or other types of contacts known to those familiar with the art.

The spoolable signal conduction and connection line is useful for a large number of various well components and as noted dramatically improves efficiency.

Figure 8:
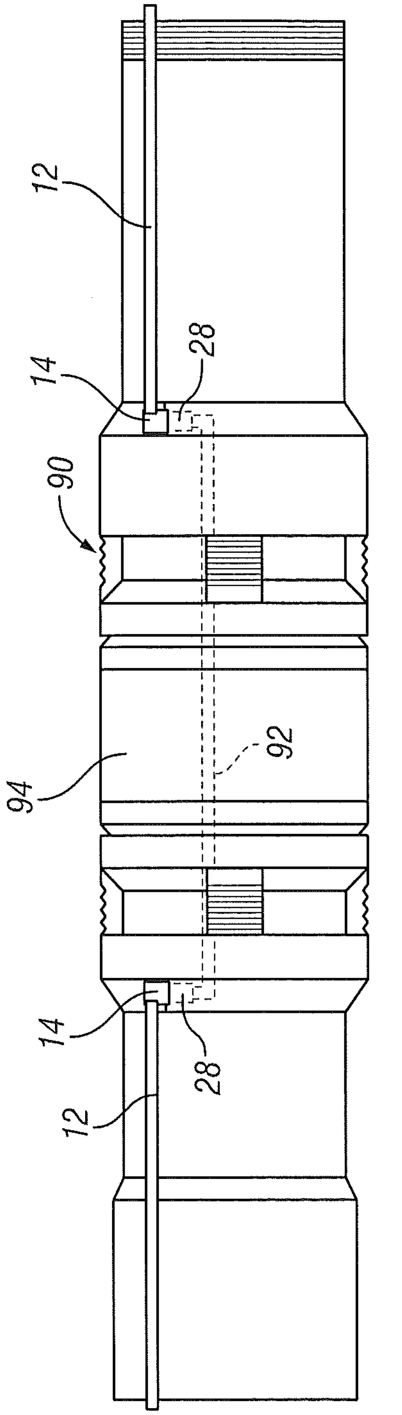
FIG. 8 is a schematic representation of a packer having a spoolable line connected thereto, and a broken line indicator of a pass through line therein.

It should be appreciated from the foregoing that the connectors may be utilized to deliver signal to components of the string along its length but it is also possible to employ the concept disclosed herein to particular tools or components that present issues for lines passing therepast. More specifically reference is made to FIG. 8 where a packer 90 is illustrated. The packer itself, in this case, does not require signal connection but as will be appreciated to one of skill in the art it does present an issue with respect to the pass through of a line. More specifically, lines if not included during the manufacturing process cause leaks. Additionally, it is very time consuming to pass the line through the component at the time of installation into the well. Therefore in conjunction with the disclosure herein it is beneficial to build a pass through 92 into the packer 90 and provide for receptors 28 on uphole and downhole ends of the packing element 94 to allow both easy access to connection points and to avoid impacting the function of the element 94. The receptors are in other respects treated as noted hereinbefore.

It is to be noted that in order to maximize efficiency in use of the spoolable line disclosed herein, the particular line may be planned to include the connectors 14 at intervals along the line that are related to the actual spacing of the components on the string to be created. In this event, the connectors will naturally come off the spool proximate to the location where they need to be joined with receptors on the components of the string. It will of course be appreciated that where line length between connections is excessive for the string spacing, the line may be gathered or wound around the string to take up excess length. And where the line is too short, it is possible to create a "patch cord" using the connector and receptors to lengthen the line.

While in the above description there is a suggestion that electrical connection is contemplated, it is to be appreciated that any signal and any signal carrying conductor is contemplated for use with the spoolable signal conduction and connection line.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A spoolable signal conduction and connection line for a downhole environment comprising:

a length of signal conduction and connection line suitable for the downhole environment, the length of signal conduction and connection line comprising a signal conductor; and one or more connectors depending from the line intermediately along a length of the line, the connectors capable of making a signal bearing connection for the downhole environment, wherein the length of signal conduction and connection line together with the one or more connectors depending therefrom is operatively arranged to be spoolable on and unspoolable from a spool;

each of the one or more connectors comprising a first line stub and a second line stub that are configured to be integrally mounted to the signal conduction and connection line wherein the signal conductor passes through each of the one or more connectors from the first line stub to the second line stub;

each of the one or more connectors comprising (i) a contact that makes a signal bearing connection to the signal conductor between the first line stub and the second line stub and (ii) a sealing surface separate from the first line stub and the second line stub and configured to seal to a receptor having a contact that is complementary to the contact of the one or more connectors.

2. A spoolable signal conduction and connection line for a downhole environment as claimed in claim 1, wherein the connector operates to mate electrical contacts.

3. A spoolable signal conduction and connection line for a downhole environment as claimed in claim 1, wherein the connector includes a device.

4. A spoolable signal conduction and connection line for a downhole environment as claimed in claim 1 wherein the line includes a metal jacket.

5. A spoolable signal conduction and connection line for a downhole environment as claimed in claim 1 wherein the connector comprises:

a number of taps and contacts, supported and insulated within a housing of the connector.

6. A spoolable signal conduction and connection line for a downhole environment as claimed in claim 1 wherein the one or more connectors include a pressure seal configuration.

7. A spoolable signal conduction and connection line for a downhole environment as claimed in claim 6 wherein the pressure seal configuration is a metal-to-metal seal configuration.

8. A spoolable signal conduction and connection line for a downhole environment as claimed in claim 6 wherein the one or more connectors include a pressure test configuration enabling testing of each pressure seal.

9. A spoolable signal conduction and connection line for a downhole environment as claimed in claim 6 wherein the seal configuration is a frustoconical portion of the connector receptive to a frustoconical portion of a receptor to produce a metal to metal seal.

10. A spoolable signal conduction and connection line for a downhole environment as claimed in claim 1 wherein the one or more connectors are receptive to receptors that are mounted at a tubing string component with which the line is to be associated.

11. A spoolable signal conduction and connection line for a downhole environment as claimed in claim 1 wherein the one or more connectors comprise a resilient insulator covering contacts thereof.

12. A spoolable signal conduction and connection line for a downhole environment as claimed in claim 11 wherein the resilient insulator is defeatable to allow connection between one or more contacts of the one or more connectors and one or more contacts of one or more receptors.

13. A spoolable signal conduction and connection line for a downhole environment as claimed in claim 1 wherein the one or more connectors are protected from contaminants and abrasion by a protector sleeve.

14. A spoolable signal conduction and connection connector for a line comprising:

a housing;

two line stubs extending from the housing, the two line stubs being configured to pressure tightly attach to a line comprising a signal conductor intermediately along a length of the line such that the connector when attached to the line is part of that line such that the connector together with that line are operatively arranged to be spoolable on and unspoolable from a spool;

a volume defined by the housing wherein the signal conductor passes through the volume between the two line stubs;

a contact assembly disposed within the housing operatively arranged for making a signal bearing connection to the signal conductor in the volume between the two line stubs intermediately along the length of the line; and a pressure seal at the housing, separate from the two line stubs, and pressure tightly receptive of a receptor having a contact that is complementary to the contact assembly of the one or more connectors.

15. A spoolable signal conduction and connection connector for a line as claimed in claim 14 wherein the housing includes a cap initially open and fixable to the housing.

16. A spoolable signal conduction and connection connector for a line as claimed in claim 14 wherein the one or more line stubs are configured for orbital welding to a line.

17. A spoolable signal conduction and connection connector for a line as claimed in claim 14 wherein the line is a control line having one or more conductors therein.

18. A spoolable signal conduction and connection connector for a line as claimed in claim 14 wherein the contact assembly includes one or more taps forming or connected to one or more contacts;

a reinforcing plate sealed to the one or more contacts; and an insulator plate disposed between the one or more contacts and the reinforcing plate.

19. A spoolable signal conduction and connection connector for a line as claimed in claim 14 wherein the contact assembly is secured within the housing.

20. A method for signal connecting a line to a tubing string comprising:

spooling out the line of claim 1; and joining the one or more connectors with one or more complementary receptors disposed in components of the tubing string.

21. A method for signal connecting a line to a tubing string as claimed in claim 20 wherein the joining is signal conductive and pressure tight.

22. A downhole component comprising:

a pass through line disposed within the component; and one or more receptors on the line receptive to a connector as claimed in claim 14.

* * * * *